United States Patent [19]

Bruns

[11] 3,950,216

[45] Apr. 13, 1976

[54] FALLING FILM EVAPORATOR

[75] Inventor: Lester E. Bruns, Kennewick, Wash.

[73] Assignee: The United States of America as represented by the United States Energy Research and Development Administration, Washington, D.C.

[22] Filed: Jan. 18, 1974

[21] Appl. No.: 434,457

[52] U.S. Cl. ...... 159/13 R; 159/28 R; 159/DIG. 12; 159/DIG. 15; 165/154; 165/164
[51] Int. Cl.$^2$. B01D 1/22; B01D 1/00; B22C 19/04; B22C 13/04
[58] Field of Search ......... 159/13 R, DIG. 15, 28 R, 159/DIG. 12, 286, 13 A, DIG. 29, 13 C, DIG. 19, 28 D; 202/234, 235, 158, 236, 267; 165/181, 115, 116; 261/97, 98; 122/44 A

[56] References Cited
UNITED STATES PATENTS

| | | | |
|---|---|---|---|
| 556,040 | 3/1896 | Alberger | 159/13 R |
| 1,796,059 | 3/1931 | Suida | 159/DIG. 29 |
| 2,867,425 | 1/1969 | Teller | 202/158 X |
| 2,905,596 | 9/1959 | Findlay | 159/DIG. 29 |
| 2,946,726 | 7/1960 | Markeli, Jr. | 202/236 |
| 2,960,449 | 11/1960 | Williamson | 159/28 R UX |
| 3,054,729 | 9/1962 | Smith | 159/DIG. 15 |
| 3,152,984 | 10/1964 | Winsche et al. | 159/DIG. 12 |
| 3,332,468 | 7/1967 | Dietze et al. | 159/13 A |
| 3,575,814 | 4/1971 | Bahrenburg | 202/236 |
| 3,653,424 | 4/1972 | Carlsson | 159/DIG. 29 |
| 3,654,092 | 4/1972 | St. Clair | 159/13 R |
| 3,661,732 | 5/1972 | Withrow | 159/13 R |

*Primary Examiner*—Jack Sofer
*Attorney, Agent, or Firm*—John A. Horan; Arthur A. Churm; Frank H. Jackson

[57] ABSTRACT

A falling film evaporator including a vertically oriented pipe heated exteriorly by a steam jacket and interiorly by a finned steam tube, all heating surfaces of the pipe and steam tube being formed of a material wet by water such as stainless steel, and packing within the pipe consisting of Raschig rings formed of a material that is not wet by water such as polyvinylidene fluoride.

2 Claims, 8 Drawing Figures

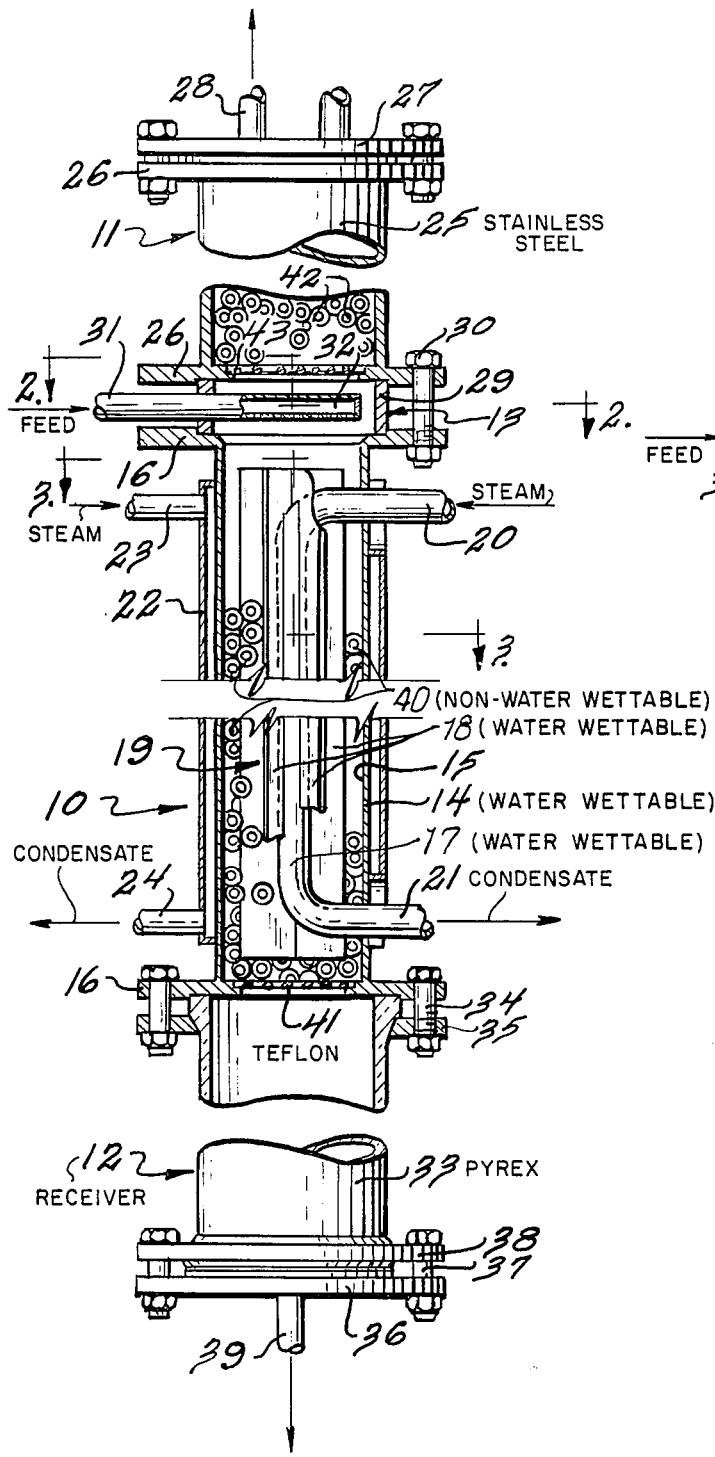
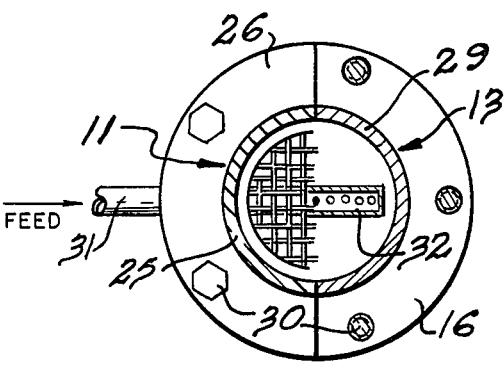
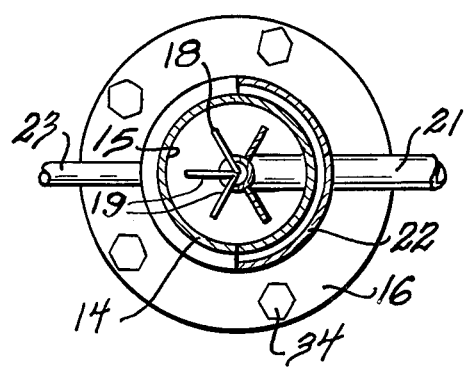

FALLING FILM EVAPORATOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a falling film evaporator. In more detail, the invention relates to a falling film evaporator of simple construction incorporating novel means for insuring that all heating surfaces are wetted as efficiently as possible. In still more detail, the invention relates to a falling film evaporator suitable for use with salting and severely scaling liquids. The invention more particularly relates to a falling film evaporator useful for the evaporation of solutions containing plutonium and minor amounts of organic solvents with vapor pressures that allow removal by steam stripping.

While presently available evaporators can be used for the evaporation of solutions containing plutonium, none are known which combine the virtues of simplicity and low cost with the attributes desired of an evaporator to be used for the purpose. For example, since the solutions are heat sensitive and prone to contamination from materials of construction, the evaporator should provide a short residence time for the solution to be concentrated. In addition, it should be possible to evaporate a solution containing a high percentage of salts therein, in some cases to the stage of salt deposition, with no clogging of the evaporator. In addition, since such solutions contain a minor amount of organic solvent, it would be desirable to remove the organic solvent at the same time as the water is removed. It is to be noted that many presently available evaporators can remove the water but reflux the organic phase. Such evaporators will not efficiently strip organic solvent from the feed and a separate steam stripping operation must be employed.

Falling film evaporators are known to be very useful for evaporating heat-sensitive materials particularly under a vacuum. The principal problems with falling film evaporators are feed distribution and complexity of equipment (rotary wipers, etc.). To optimize operation of falling film evaporators, it is essential that all heated surfaces be wetted as completely as possible. Recirculation of the liquid and/or various proprietary distributors may be used to help ensure this, but other problems such as complexity of equipment (e.g. failure of working parts) and inefficient organic stripping may arise. In addition, evaporators of this type are generally unsuited to salting or severely scaling liquid due to the possibility that tubes will clog, bearings will freeze, plates will plug, etc.

In the processing of nuclear fuel employing TBP (tributylphosphate) as extractant, solutions are obtained containing plutonium nitrate and small quantities of TBP. Product solutions are obtained containing a relatively high concentration of plutonium and waste solutions are obtained containing a low concentration of plutonium. The evaporator of the present invention can be used to concentrate either of these solutions. The evaporator of the present invention was designed with these solutions in mind but would, of course, be useful with other feed materials.

Another important feature of this tube type evaporator is that the maximum diameter can be limited to 6 inches I.D. (inside diameter). Hence fissile materials like plutonium can be concentrated while assuring critical mass safety, i.e., the geometry is such that the leakage of neutrons is always greater than the buildup of neutrons and the system cannot go critical. By lengthening the tubes or having a series of tubed sections, the desired capacity can be attained, equipment is simple (no moving parts to worry about) and critical mass safety is assured.

SUMMARY OF THE INVENTION

The falling film evaporator of the present invention is heated internally and externally with all heating surfaces being formed of a material that is wet by water and includes, as a feed distribution mechanism, packing consisting of Raschig rings formed of a material that is not wet by water.

BRIEF DESCRIPTION OF THE DRAWING

The invention will next be described in connection with the drawing wherein:

FIG. 1 is a vertical section of a falling film evaporator according to the present invention;

FIG. 2 is a horizontal section taken in the direction of the arrows 2—2 in FIG. 1;

FIG. 3 is a horizontal section taken in the direction of the arrows 3—3 in FIG. 1;

SPECIFIC EMBODIMENT OF THE INVENTION

Figure 4:
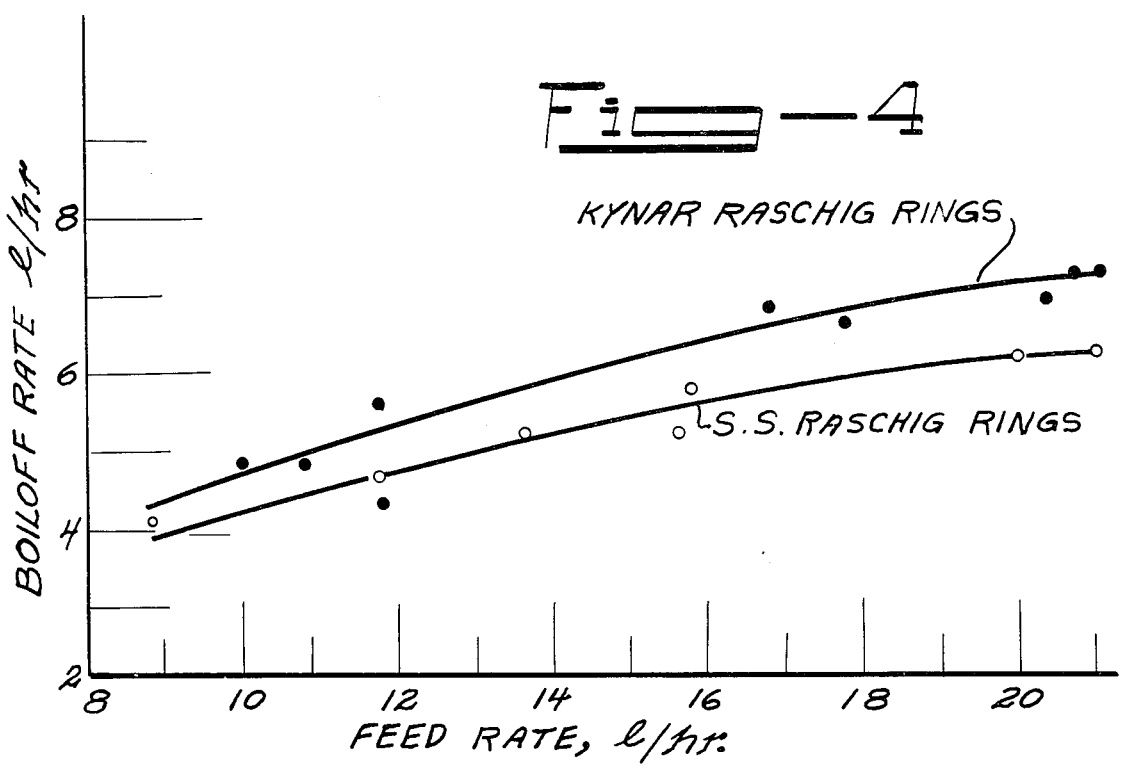
FIG. 4 is a graph comparing results obtained using polyvinylidene (Kynar) Raschig rings as packing and results with stainless steel Raschig rings as packing.

As shown in the drawing, the falling film evaporator of the present invention contains an evaporating section 10, a disengaging section 11 above the evaporating section, a receiving section 12 below the evaporating section and a feed section 13 between the evaporating section and the disengaging section. Evaporating section 10 is defined by a vertically oriented, 5-inch diameter, stainless steel pipe 14, the interior thereof constituting a heating surface 15. Pipe 14 has flanges 16 at the top and bottom thereof. Axially disposed within evaporating section 10 is a stainless steel steam pipe 17 having longitudinal stainless steel fins 18 thereon. The exterior of pipe 17 and the surfaces of fins 18 constitute heating sufaces 19. Steam pipe 17 is provided with steam inlet 20 and condensate outlet 21. Surrounding evaporating section 10 is a heating jacket 22 provided with a steam inlet 23 and a condensate outlet 24. It is essential to the present invention that heating surfaces 15 and 19 be formed of a material which is wet by water. Thus stainless steel has been specified as the material of choice for pipe 14, steam pipe 17 and fins 18. Other corrosion and heat-resistant materials which are wet by water such as Hastelloys could also be employed.

Disengaging section 11 is defined by a 6-inch diameter stainless steel pipe 25 provided with flanges 26 at the top and bottom thereof. A cover 27 through which a vent pipe 28 passes is bolted to the top flange 26. Vent pipe 28 leads to a condenser (not shown). Feed section 13 is defined by a 6-inch diameter stainless steel pipe section 29 which is clamped between top flange 16 of pipe 14 and bottom flange 26 of pipe 25 by bolts 30. A feed line 31 terminating in a polyvinylidene (Kynar) nozzle 32 having openings in the bottom thereof extends into the interior of feed section 13. Receiving section 12 is defined by a 6-inch Pyrex pipe 33 which is attached to the bottom flange 16 of pipe 14 by bolts 34 and clamping ring 35 and to which is attached a bottom cover 36 by bolts 37 and clamping ring 38. An outlet line 39 is provided extending through cover 36.

According to an important feature of the present invention, evaporating section 10 is filled with plastic Raschig rings 40 supported therewithin by a perforated plastic (Teflon) sheet 41 extending across the bottom of evaporating section 10. The Raschig rings must be formed of a nonwater-wettable, chemically and heat-resistant plastic material such as Kynar (polyvinylidene fluoride) or Teflon (polytetrafluoroethylene). In addition, disengaging section 11 is filled with plastic Raschig rings 42 supported therewithin by a perforated plastic (Teflon) sheet 43 extending across the bottom of disengaging section 11. It will be appreciated that Raschig rings 42 are employed conventionally to improve the disengagement of liquid and vapor in disengaging section 11. Polyvinylidene fluoride rings are suitable.

A specific evaporator which was employed in the examples given hereafter included a 24-inch long evaporator section, a 12-inch long receiver section, a 12-inch long disengaging section and a 1½-inch long feed section. Kynar Raschig rings which were 1 inch in exterior diameter, ¾ inch in interior diameter and 1 inch high were employed and for comparison ½-inch diameter stainless steel Raschig rings were employed in some tests.

It will be appreciated that the device hereinbefore specifically described was not designed for plant-scale use but rather was designed to carry out the laboratory-scale experiments next to be described. Plant-scale apparatus would be different in detail but would incorporate the essential features of the present invention as defined in the appended claims.

A number of tests have been carried out employing the above-described apparatus to concentrate synthetic feeds simulating solutions obtained in the processing of nuclear fuel and to compare the results obtained with the results obtained using stainless steel Raschig rings in the evaporator.

Using 2 M $HNO_3$ as feed, the boiloff rate at various feed rates for each type of Raschig ring follows:

These results are plotted in FIG. 4. This graph shows that the boiloff rate increases slowly with increasing feed rate at feed rates above 17 liters/hr. Thus the optimum feed rate would be about 17 liters/hr. The graph also shows that the evaporation rate was 10-15 percent higher using Kynar rings rather than stainless steel rings. While these results are not directly comparable due to the difference in size of the rings — the specific rings used were employed solely because they were immediately available — it is to be expected that even worse results would be attained with larger stainless steel rings — rings directly comparable in size to the Kynar rings employed.

It is believed that the improved results attained with the Kynar rings compared to the stainless steel rings is due to the relative wettability of the two materials, Kynar not being wettable with water and stainless steel being wettable by water. It is believed that the Raschig rings function solely as a distributor, essentially all evaporation occurring on heating surfaces 15 and 19. Since the plastic material from which the Raschig rings are formed is not wet by water, drops of the feed solution form on the rings and roll rapidly off the rings to a metal heating surface. Since the heating surfaces are wet by water, the liquid spreads out thereon, forming a film which is quickly evaporated with any runoff being picked up by the rings for redistribution to a heating surface lower in the evaporator. Metal Raschig rings, on the other hand, are wet by water and a film of water forms thereon. Since the rings are not heated directly, evaporation is slow from the rings and the solution does not roll rapidly off the rings to a heating surface.

Further tests employing a falling film evaporator incorporating plastic Raschig rings were made using synthetic solutions similar to waste solutions obtained in the processing of nuclear fuel. One solution has a low salts content and the other a high salts content. Table II gives the composition of the feed solutions.

TABLE II

| | SYNTHETIC FEED SOLUTIONS | |
| --- | --- | --- |
| | Low Salt | High Salt |
| $AlF(NO_3)_2$ | 0.50 M | 0.87 M |
| $Al(NO_3)_3$ | 0.08 M | 0 |
| $Mg(NO_3)_2$ | 0.13 M | 0.2 M |
| $Ca(NO_3)_2$ | 0.03 M | 0.2 M |
| $Fe(NO_3)_3$ | 0.02 M | 0.08 M |
| $KNO_3$ | 0.54 M | 0.96 M |
| $NaNO_3$ | 0.89 M | 1.36 M |
| Sp gr | 1.214 | 1.35 |
| pH | 1.6 | |
| | (adjusted to 0.6) | (adjusted to 0.5) |

Table III presents the data obtained.

BOILOFF RATE VERSUS FEED RATE
*Kynar Raschig rings - ¾ in.

| Feed rate, liters/hr | 10.0 | 10.8 | 11.8 | 11.8 | 15.6 | 16.8 | 17.8 | 20.4 | 20.7 | 21.0 |
| --- | --- | --- | --- | --- | --- | --- | --- | --- | --- | --- |
| Boiloff rate, liters/hr | 4.8 | 4.8 | 4.35 | 5.6 | 5.2 | 6.8 | 6.6 | 6.9 | 7.2 | 7.2 |
| % boiloff | 0.480 | 0.445 | 0.367 | 0.475 | 0.333 | 0.405 | 0.370 | 0.338 | 0.348 | 0.342 |

Stainless steel Raschig rings - ½ in.

| Feed rate, liters/hr | 8.8 | 11.8 | 13.6 | 14.0 | 15.8 | 20.0 | 21.0 |
| --- | --- | --- | --- | --- | --- | --- | --- |
| Boiloff rate, liters/hr | 4.1 | 4.6 | 5.2 | 5.0 | 5.8 | 6.2 | 6.2 |
| % boiloff | 0.458 | 0.390 | 0.382 | 0.358 | 0.367 | 0.310 | 0.295 |

*Kynar is a polyvinylidene fluoride product by Pennwalt.

TABLE III

RUN DATA

| Run | Steam Pressure psi | Feed Rate l/hr | Distill-ation Rate l/hr | Product Rate l/hr | % of Feed Distilled | % of Feed as Product | Average Temperatures °C | | | |
|---|---|---|---|---|---|---|---|---|---|---|
| | | | | | | | Vapor | (Feed Entry) | Center | (Product Exit) |
| Low Salt | | | | | | | | | | |
| 1 | 55 | 15.8 | 10.5 | 5.3 | 66 | 34 | 108 | 114 | 111 | 124 |
| 2 | 55 | 18.4 | 10.5 | 7.9 | 57 | 43 | 107 | 110 | 107 | 122 |
| 3 | 55 | 16.4 | 10.5 | 6.0 | 64 | 36 | 107 | 110 | 108 | 122 |
| 4 | 55 | 10.7 | 7.7 | 3.0 | 72 | 28 | 105 | 108 | 104 | 108 |
| 5 | 55 | 10.8 | 8.3 | 2.6 | 76 | 24 | 107 | 109 | 104 | 106 |
| 6 | 55 | 7.1 | 5.7 | 1.4 | 80 | 20 | 106 | 109 | 108 | 117 |
| 7 | 38 | 10.4 | 6.7 | 3.7 | 64 | 36 | 105 | 106 | 104 | 110 |
| High Salt (Slug of organic) | | | | | | | | | | |
| 8 | 45 | 19 | 8.5 | 10.5 | 45 | 55 | 105 | 106 | 106 | 109 |
| 9 | 53 | 14.2 | 7.2 | 7.0 | 51 | 49 | — | — | — | — |

Figure 5:
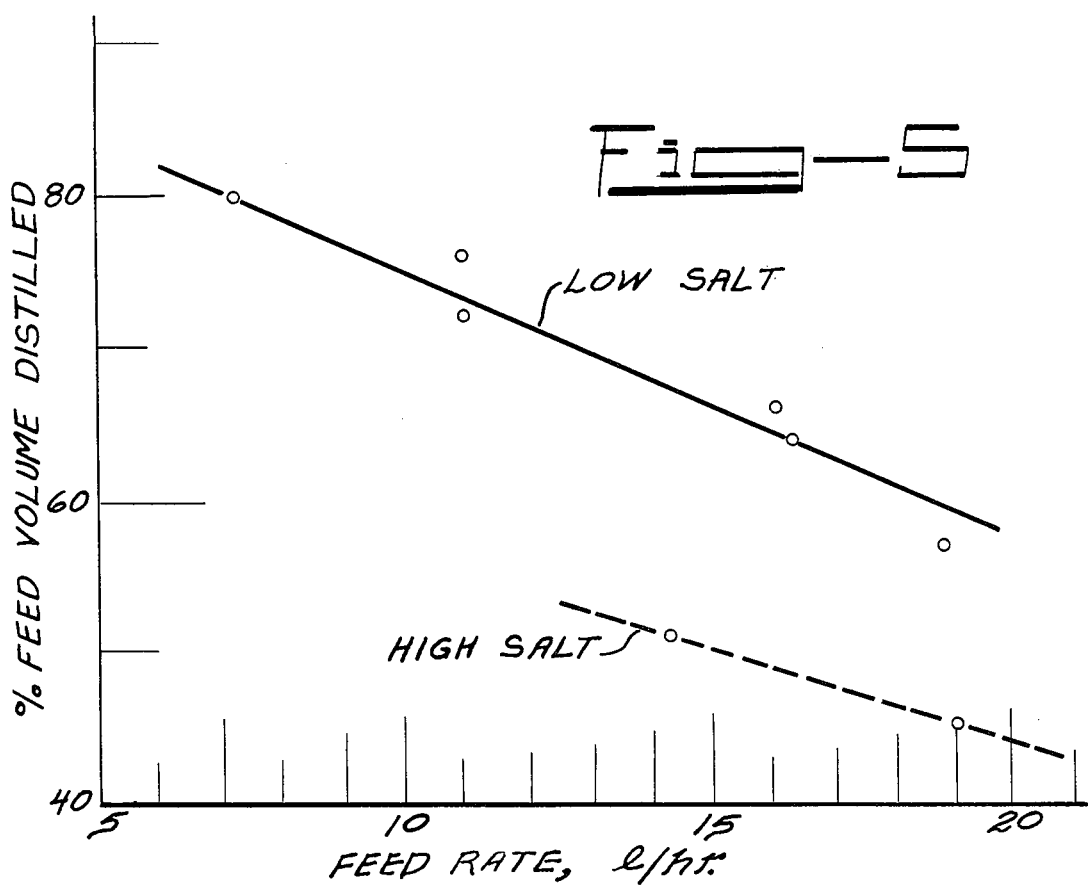
FIG. 5 is a graph showing the effect of varying the feed rate vs the percent of feed volume in the distillate.

Most of the runs used 55 psi steam pressure (the maximum obtainable from the present source). Lower steam pressures of 35 and 45 psi appeared to have an insignificant effect on evaporator operation. The effect of varying the feed rate on the percent of feed volume in the distillate is shown in FIG. 5. Feed rates about 15 liters/hr yielded pumpable concentrates, even at room temperatures. Low feed rates yield optimum $H_2O$ removal and the concentrate solidifies when slightly cooled. It is thus possible to evaporate a solution to dryness using this concentrator by permitting the concentrate to drop into receiving section 12.

It will be noted that the high salt solution contained organic solvent in an amount greater than the solubility limit of TBP in the aqueous solution being concentrated, "slug of organic" being so defined. Essentially all of this solvent was removed fro the concentrate in the film evaporator.

Further tests were performed on synthetic waste solutions simulating low-salt, typical-salt and high-salt feed. These solutions were prepared with a matrix of 0.23 M $Ca(NO_3)_2$, 0.47 M $Mg(NO_3)_2$, 1.36 M $NaNO_3$, and 0.08 M $Fe(NO_3)_3$ for a total nitrate concentration of 3 molar. Using this 3 M nitrate solution,

| Total Nitrate M | $AlF(NO_3)_2$ M | $Al(NO_3)_3$ M | KNO M |
|---|---|---|---|
| 4.5 | 0.4 | 0.1 | 0.4 |
| 6.0 | 0.8 | 0.2 | 0.8 |
| 7.5 | 1.2 | 0.3 | 1.2 |

These solutions were labeled low-salt, typical-salt, and high-salt feed.

The synthetic feeds were pumped into an evaporator at flow rates which are varied from 2 to 21 liters/hr. The evaporator section was 2 feet high by 6 inches in diameter packed with Kynar Raschig rings. Vapors from the evaporator section passed through a perforated Teflon plate, through a 12-inch bed of Kynar rings (scrub section), and into a condenser. Concentrate from the evaporator section passed downward through a perforated Teflon plate and into a glass product collection section.

Figure 6:
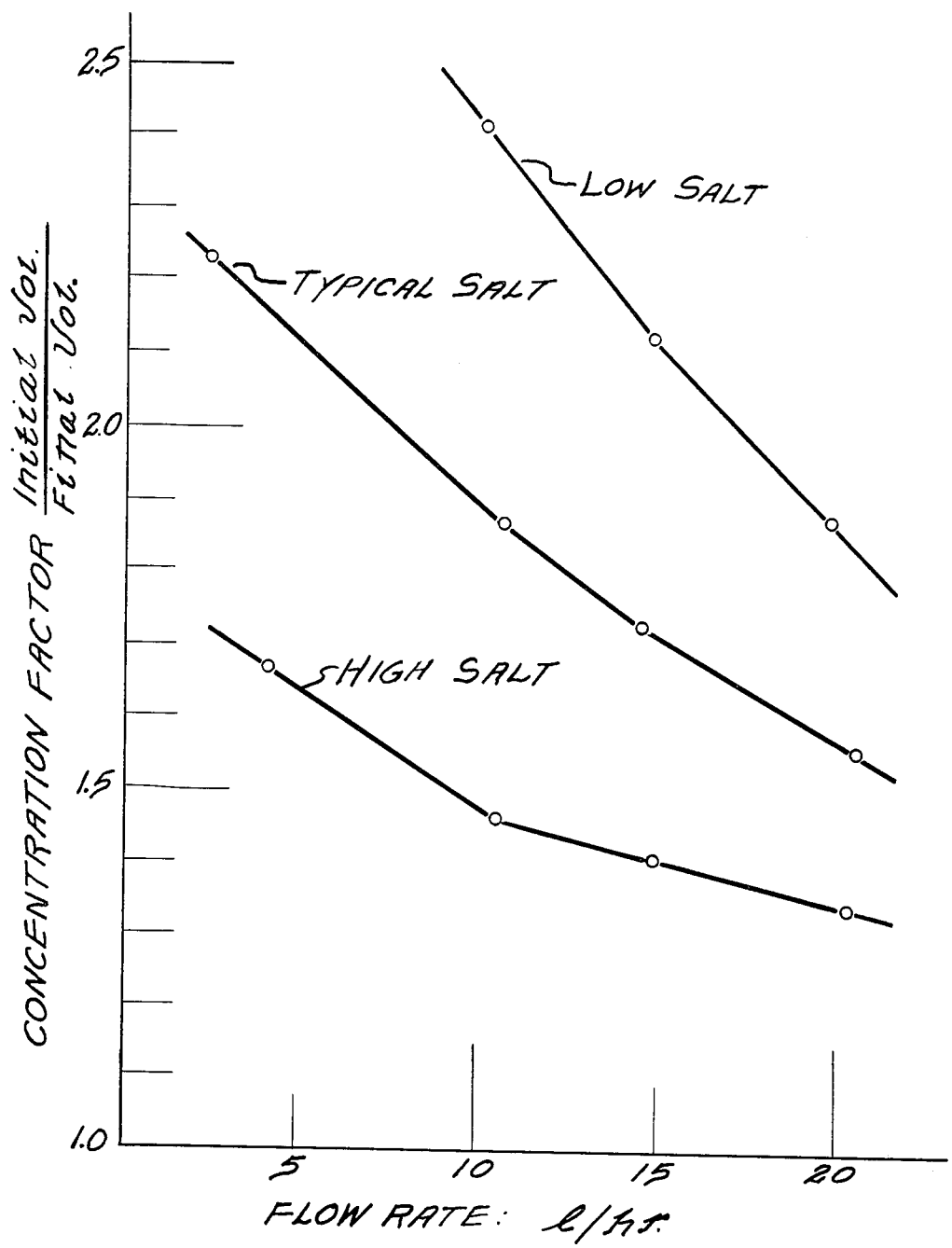
FIGS. 6 to 8 are graphs showing how the character of the concentrate is related to the operating parameters of the evaporator.
Figure 7:
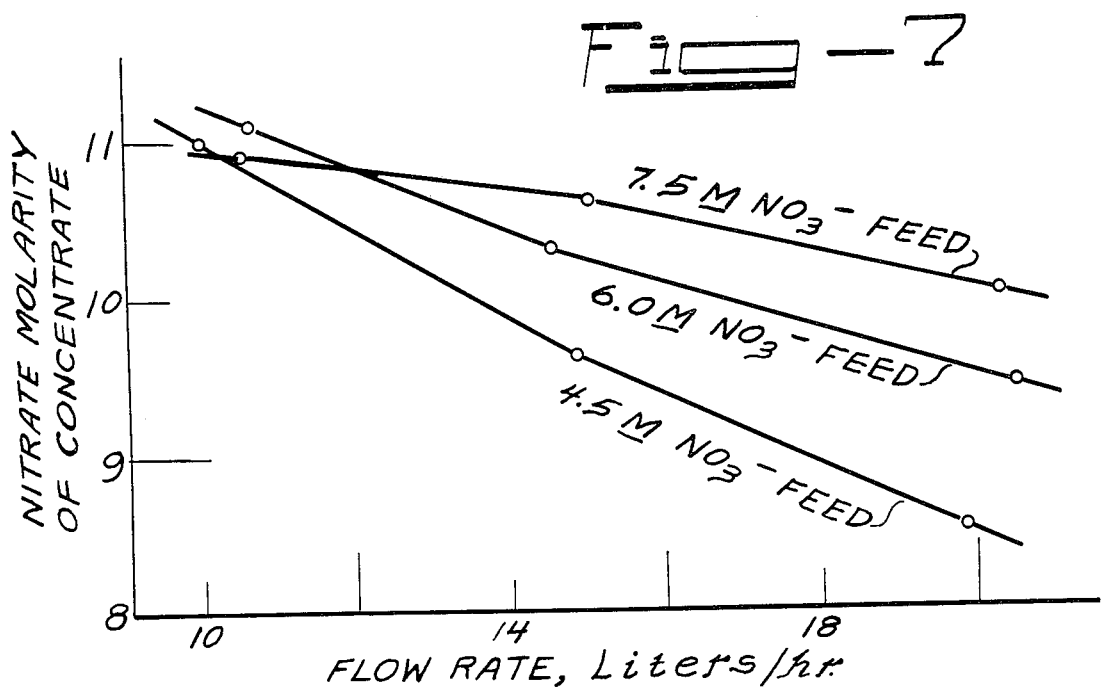
Figure 8:
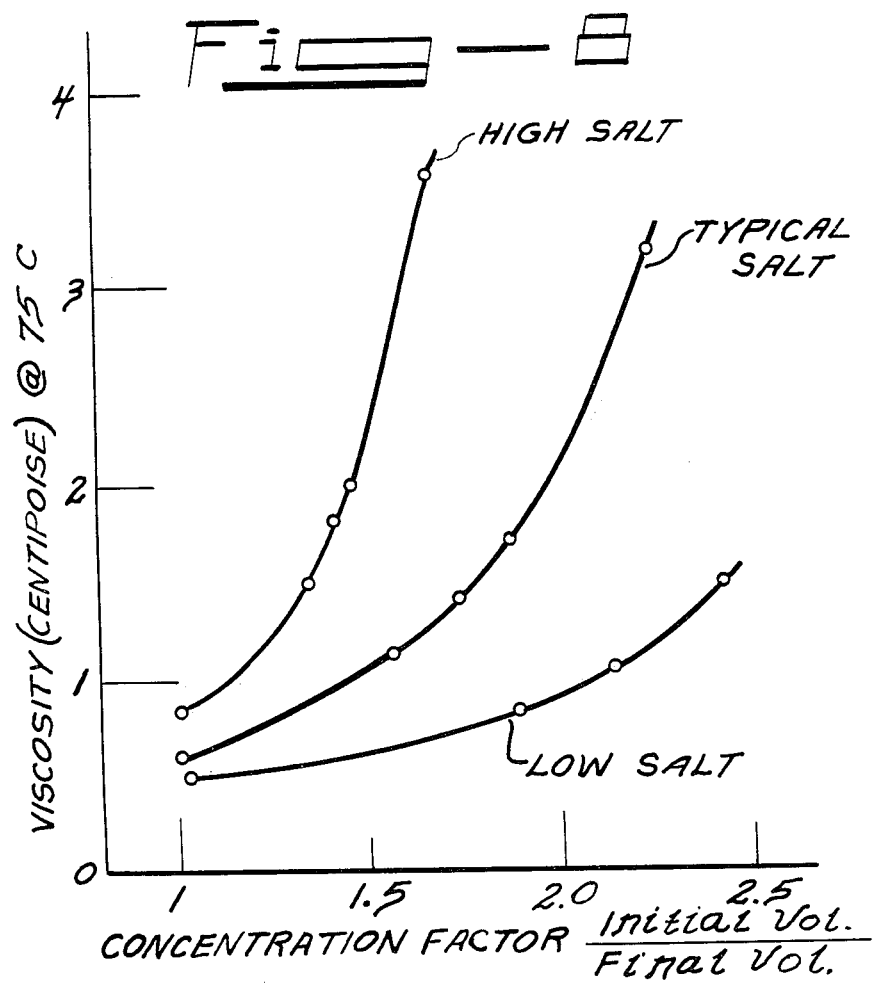

The character of the concentrate is related to the operating parameters of the evaporator as shown in FIGS. 6–8.

The degree of concentration in the evaporator is related to the salt strength of the feed and to the feed flow rate as illustrated in FIG. 6, the concentrate nitrate molarity is plotted against the flow rate as illustrated in FIG. 7, and the viscosity of the concentrate increased as the concentration factor increased and as the salt strength of the starting feed increased. See FIG. 8.

Insofar as the condensate is concerned, nitrate, sodium, and acid content of condensates were found to increase as the salt level of the feed stream increased. Evaporation of 4.5, 6.0, and 7.5 M nitrate feeds yielded condensates with average values of 0.05, 0.09, and 0.21 M nitrate ion, respectively; average values of 0.04, 0.07, and 0.14 M hydrogen ion, respectively; and average values of $6.5 \times 10^{-4}$, $6.7 \times 10^{-4}$, and $7.8 \times 10^{-4}$ M sodium ion, respectively. There was no significant correlation of the condensate levels of acid and nitrate with either the feed flow rate or the percent the feeds were evaporated.

The sodium concentration in the condensate was used to predict future plutonium condensate values based on the premise that physical entrainment of both species in the concentrator vapors would be similar. With a feed of 1.36 M sodium and a condensate average of $7 \times 10^{-4}$ sodium, the sodium decontamination factor (DF) was approximately 2000. Since the plutonium feed concentration was expected to vary between $1 \times 10^{-4}$ and $1 \times 10^{-3}$ g/liter, a DF of 2000 would yield a condensate plutonium value of $5 \times 10^{-8}$; to $5 \times 10^7$ g/liter. These levels would be a large decrease from the present levels of discharge.

It is thus clear that the evaporator is effective in evaporating solutions which simulate waste solutions obtained in processing plutonium-containing wastes. The residence time in the evaporator for the feed solution was 2 to 10 minutes, depending on the feed rates, this in distinction to the residence time of up to 2 hours in many previously available falling film evaporators. The evaporator is also suitable to concentrate solutions containing larger quantities of plutonium. For example, it will evaporate overhead essentially all of the organic solvent contained in a solution containing 50 g/liter plutonium and 0.10 to 0.15 g/liter TBP while retaining essentially all of the plutonium in a solution containing >200 g/liter plutonium. Also, the maximum diameter of the evaporator, 6 inches I.D., assures critical mass safety by geometry.

To summarize, advantage of the falling film evaporator as described over conventional units include the following a) less impurity formation in the product, b) no problems caused by corrosion of the packing, c) eliminates problems from fast reactions caused by impurity buildup, e.g., organics in a plutonium product concentrator, d) allows use of 6-inch I.D. or less systems to assure critical mass safety of fissionable species, e.g. plutonium, yet maintain high evaporator efficiency, e) can concentrate solutions for crystallization on cooling without plugging the evaporator, and f) can perform the two functions of steam stripping organic and concentrating a solution in one compact "piece of pipe."

The embodiments of the invention in which an exclusive property or privilege is claimed are defined as follows:

1. A falling film evaporator comprising a vertically oriented pipe heated exteriorly by a steam jacket and the space within said pipe interiorly by a vertically finned steam tube, all heating surfaces of said vertically oriented pipe and steam tube being formed of stainless steel which is wet by water, packing within the pipe consisting of Raschig rings formed of a polyvinylidene fluoride which is not wet by water, means for introducing a feed solution to the top of the vertically oriented pipe and means for venting vapors from the top & means for discharging concentration from the bottom of the pipe.

2. A falling film evaporator including an evaporating section, a disengaging section above the evaporating section, a receiving section below the evaporating section and a feed section between the evaporating section and the disengaging section, said evaporating section being defined by a vertically oriented pipe formed of stainless steel which is wet by water, a heating jacket surrounding said vertically oriented pipe and a finned steam tube axially disposed within said vertically oriented pipe, the finned steam tube being formed of stainless steel which is wet by water, a feed line extending into the feed section, a perforated sheet extending across the bottom of the evaporating section and packing consisting of Raschig rings formed of a polyvinylidene fluoride which is not wet by water in the evaporating section, and means for evacuating vapors at the top and means for discharging concentrate from the bottom of the pipe.

* * * * *